Sept. 29, 1959    K. TESCH    2,906,188
DIAPHRAGM MOUNT FOR PHOTOGRAPHIC OR CINEMATOGRAPHIC OBJECTIVES
Filed Nov. 12, 1958
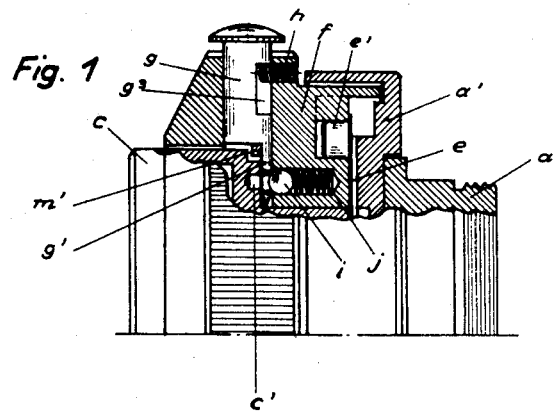
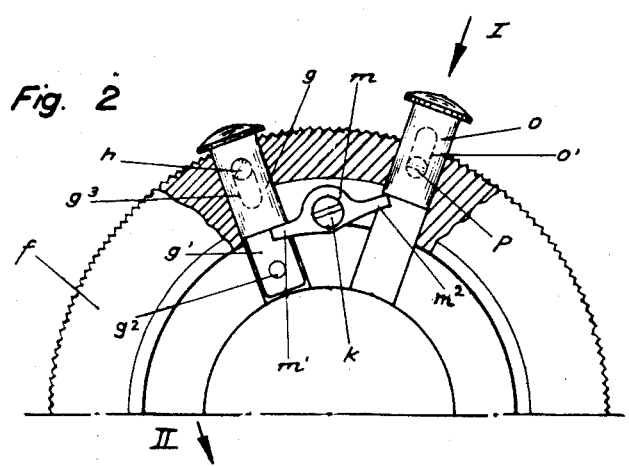
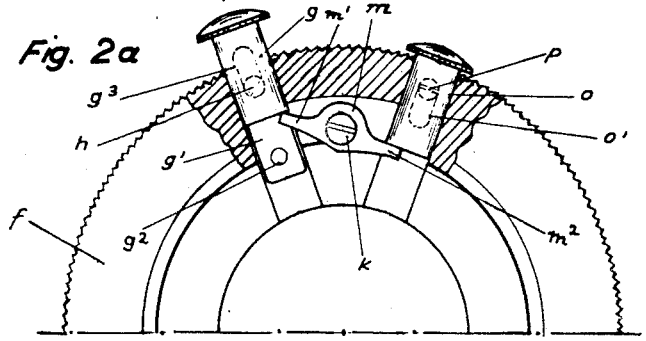
Inventor:
Karl TESCH
BY
Agent

United States Patent Office 2,906,188
Patented Sept. 29, 1959

---

2,906,188

DIAPHRAGM MOUNT FOR PHOTOGRAPHIC OR CINEMATOGRAPHIC OBJECTIVES

Karl Tesch, Kreuznach, Rhineland, Germany, assignor to Jos. Schneider & Co., Kreuznach, Rhineland, Germany, a company of Germany Application November 12, 1958, Serial No. 773,312

Claims priority, application Germany November 30, 1957

6 Claims. (Cl. 95—64)

My present invention relates to photographic or cinematographic camera objectives having means for indexing a diaphragm in a plurality of operating positions corresponding to different diaphragm openings.

The usual indexing means employed for this purpose, taking the form of a spring-urged detent in one of two relatively movable members (e.g. rings) co-operating with a series of notches or recesses in the other member, will not prevent the adjustment of the diaphragm from wide-open to substantially closed position (or vice versa) in a single sweep but will interfere with such adjustment to the extent of making the movement of the diaphragm-control member rough and uneven. This is undesirable from an esthetic viewpoint where, as in the taking of motion pictures, the sweep of the diaphragm is used to provide the effects of fade-in or fade-out. Also, repeated rapid movement of the control member past the established diaphragm stops will tend to cause undue wear to the indexing mechanism itself.

In my earlier application Ser. No. 674,449 filed July 26, 1957, of which the present application is a continuation-in-part, I have disclosed a system for selectively de-activating the indexing mechanism, with the aid of a radially moveable slider operable to disengage the spring-urged detent from its co-operating recesses, whenever a sweep adjustment of the diaphragm is desired. The slider advantageously has its extremity formed with a beveled edge which is adapted to cam the detent away from a notch engaged thereby, this extremity also having a depression to receive the detent in the inoperative position of the latter.

With cameras of limited dimensions it is rather inconvenient to provide the slider with an external head which can be readily gripped in its fully depressed position to enable the retraction of such slider. This is particularly true if the slider, along with the detent controlled thereby, is mounted in the rotatable diaphragm-setting ring which for both mechanical and esthetic reasons should be reasonably free from radial protrusions. My present invention has, accordingly, for its object the provision of improved means for selectively de-activating and re-activating a diaphragm-indexing mechanism in a manner avoiding the disadvantages referred to.

In accordance with the present invention I provide, in one of the two relatively movable annular members, a pair of radially displaceable sliders of which one has the aforementioned extremity adapted to separate a ball check or the like from the recesses or notches in the other annular member which are normally engageable thereby. A coupling element, preferably a two-armed lever, operatively interconnects the two sliders in such manner that inward movement of one of these sliders will move the other one outwardly and vice versa. By this arrangement it is possible to disengage the diaphragm from its detent and to re-engage it therewith by simple finger pressure.

The invention will be described in greater detail with reference to the accompanying drawing in which:

Fig. 1 is a side-elevational view, partly in section, of the upper half of a camera objective having a diaphragm mount provided with a detent-blocking mechanism according to the invention;

Fig. 2 is a front-elevational view, partly in section, of a setting ring forming part of the diaphragm mount of Fig. 1; and Fig. 2a is a view similar to Fig. 2, showing an alternate position of the parts.

The drawing shows only so much of a camera objective as is necessary for an understanding of the present invention. Details of the construction of and the connection between conventional parts, not relevant here, have been omitted but can be ascertained from my above-identified earlier application in which a generally similar system is illustrated. Like reference characters have been used, where applicable, to facilitate a comparison.

The objective is provided with a housing including elements $a$, $a'$ and a stationary lens mount $c$. An iris diaphragm $e$ has its aperture adjustable by means of a pin $e'$ received in a recess of a rotatable control ring $f$. The relative rotation of control ring $f$ and annular lens mount $c$ can be yieldably arrested, in a series of pre-established stop positions, by the co-operation of a ball check $i$, under pressure from a spring $j$, with a plurality of recesses $c'$ (only one shown) angularly spaced on a radial shoulder of member $c$. It will be understood that this arrangement serves, in the conventional manner, to index the control ring $f$ in various operative positions each corresponding to a particular diaphragm opening indicated on the usual diaphragm scale (not shown).

In accordance with this invention I provide a blocking mechanism for selectively disengaging the ball-shaped detent $i$ from the recesses $c'$ whenever it is desired to have free movement of the control ring $f$. This mechanism comprises a stem $g$ which is radially slidable in ring $f$ and whose inner extremity is in the form of a lug $g'$ adapted to be interposed between ball $i$ and ring $c$. Lug $g'$ has an aperture $g^2$ designed to receive the ball $i$ after the latter has been cammed to the right (as viewed in Figs. 1 and 2), against the force of its spring $j$, upon an inward displacement of stem $g$ by the fingers of the user. Stem $g$ is held against rotation in ring $f$ by a setscrew $h$, entering an elongated recess $g^3$ on the side of the stem, which also limits the extent of its radial displacement.

A second stem $o$, similar to stem $g$ but angularly displaced therefrom, is also radially slidable in ring $f$ and is guided in its movements by a slot $o'$ entered by a setscrew $p$. The two sliders $g$, $o$ are operatively interconnected by a lever $m$ which is fulcrumed to ring $f$ at $k$ and has two arms $m'$, $m^2$ respectively bearing upon the lower faces of these sliders. With the system $g$, $m$, $o$ initially assumed to be in the position of Figs. 1 and 2 in which slider $g$ is depressed to separate the detent $i$ from the notches $c'$, finger pressure upon slide $o$ in the direction of arrow I will bring about the position of Fig. 2a and will cause a withdrawal of lug $g'$ whereby ball check $i$ re-engages the nearest notch $c'$ for normal indexing operation. For renewed disengagement, finger pressure exerted upon slider $g$ in the direction of arrow II (Fig. 2a) will restore the previous position.

My invention is, of course, not limited to the specific embodiment described and illustrated but may be realized in various modifications and adaptations without departing from the spirit and scope of the appended claims.

I claim:

1. A camera objective comprising a lens housing, a first annular member fixed to said housing, a diaphragm with adjustable aperture supported by said first annular member, a second annular member rotatable relatively to said first annular member and provided with control means for adjusting the aperture of said diaphragm, one of said annular members being provided with at least one recess, the other of said annular members being provided with a spring-urged detent adapted to enter said recess in an intermediate stop position for camming engagement therewith so as yieldably to arrest the rotation of said second annular member, and blocking means selectively interposable between said detent and said recess; said blocking means including a pair of radially movable elements lodged in said other annular member and provided with extremities projecting therefrom, one of said elements having a cam-shaped extension positioned to displace said detent against its spring force upon an inward displacement of said one element, and coupling means operatively connecting said elements for opposite radial movement.

2. A camera objective according to claim 1 wherein said detent comprises a ball check.

3. A camera objective according to claim 1 wherein said coupling means comprises a lever having two arms respectively positioned in abutting relationship with said elements.

4. A camera objective according to claim 3 wherein said lever is fulcrumed on said other annular member between said elements.

5. A camera objective comprising a lens housing, a first annular member fixed to said housing, a diaphragm with adjustable aperture supported by said first annular member, a second annular member rotatable relatively to said first annular member and provided with control means for adjusting the aperture of said diaphragm, said first annular member being provided with at least one recess, said second annular member being provided with a spring-urged ball check adapted to enter said recess in an intermediate stop position for camming engagement therewith so as yieldably to arrest the rotation of said second annular member, and blocking means selectively interposable between said ball check and said recess; said blocking means including a pair of radially movable sliders lodged in said second annular member and provided with extremities projecting therefrom, one of said sliders having a cam-shaped extension positioned to displace said ball check against its spring force upon an inward displacement of said one slider, and coupling means operatively connecting said sliders for opposite radial movement.

6. A camera objective according to claim 5 wherein said coupling means comprises a two-armed lever pivoted on said second annular member intermediate said sliders and having each of its extremities positioned in abutting relationship with a respective slider.

References Cited in the file of this patent

UNITED STATES PATENTS

| | | |
|---|---|---|
| 1,417,527 | Howell | May 30, 1922 |
| 2,222,298 | Nerwin | Nov. 19, 1940 |
| 2,487,308 | Castedello | Nov. 8, 1949 |
| 2,527,243 | Cronholm | Oct. 24, 1950 |
| 2,612,093 | Shutz | Sept. 30, 1952 |